March 4, 1958     H. R. FISCHER ET AL     2,825,206
PNEUMATIC-HYDRAULIC POWER UNIT
Filed Dec. 12, 1956     5 Sheets-Sheet 1
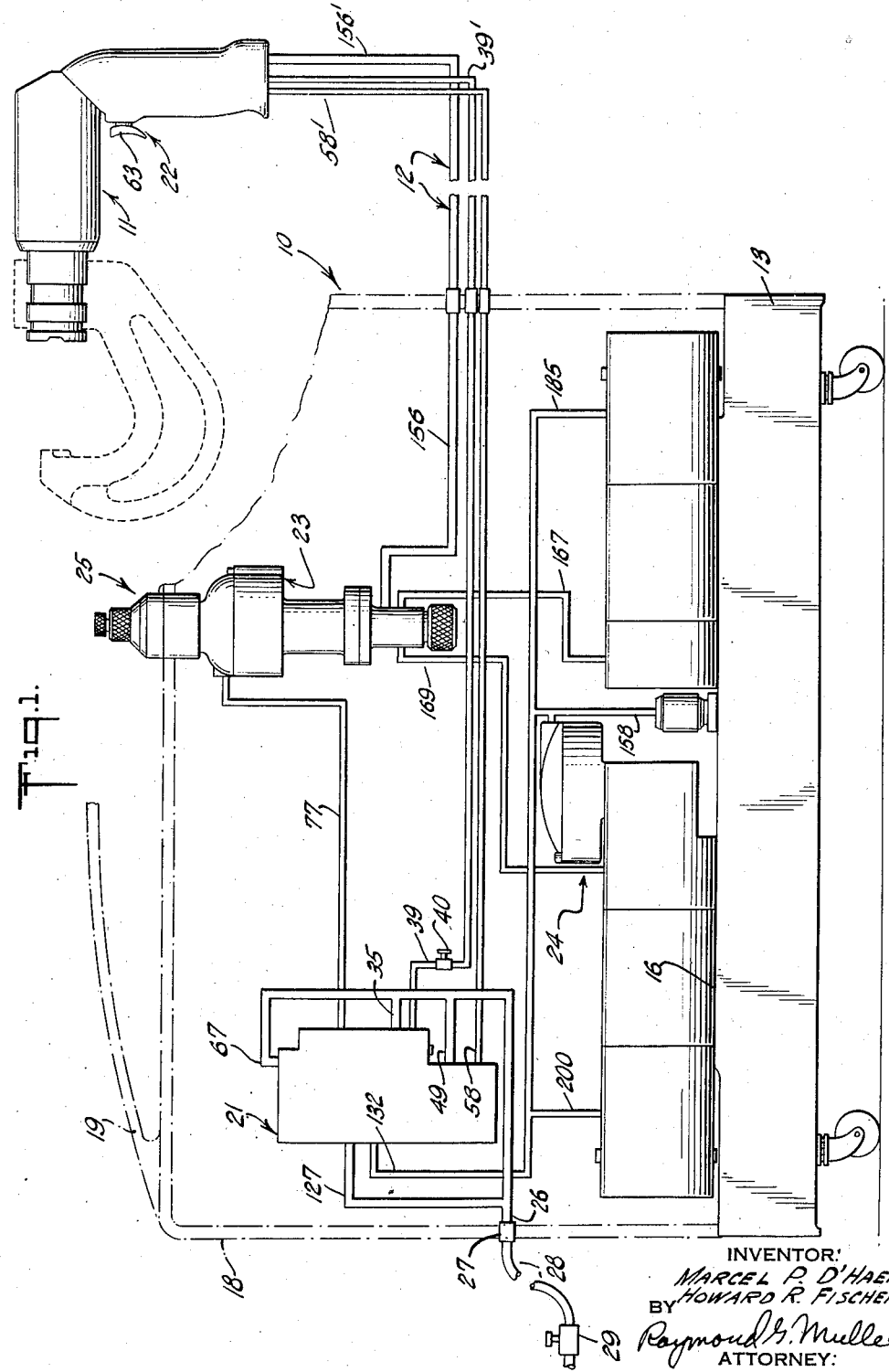
INVENTOR:
MARCEL P. D'HAEM
HOWARD R. FISCHER.
BY Raymond G. Mullee
ATTORNEY:

March 4, 1958 H. R. FISCHER ET AL 2,825,206
PNEUMATIC-HYDRAULIC POWER UNIT
Filed Dec. 12, 1956 5 Sheets-Sheet 2

INVENTORS:
MARCEL P. D'HAEM
HOWARD R. FISCHER
BY Raymond G. Mueller
ATTORNEY:

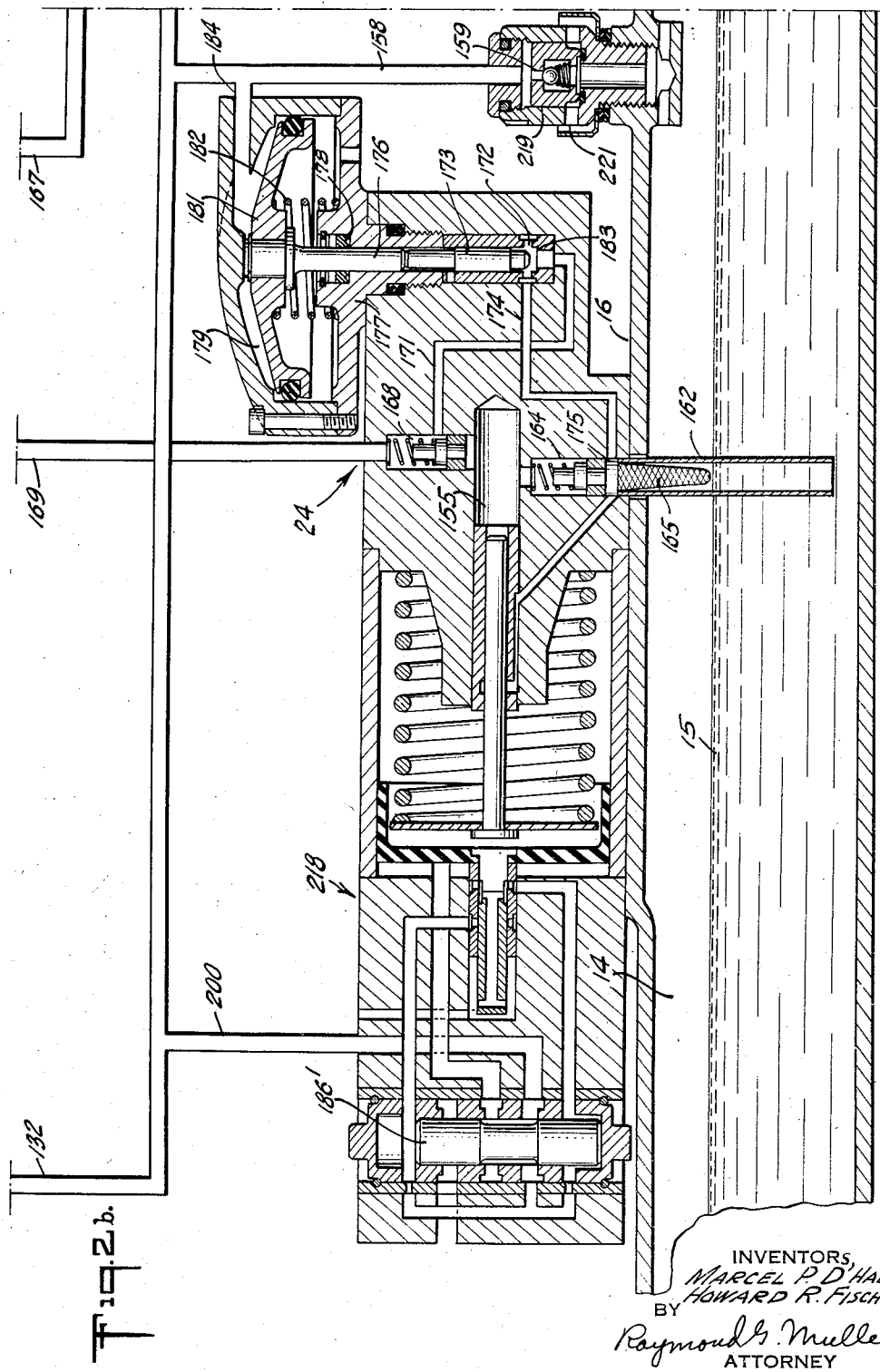

March 4, 1958 H. R. FISCHER ET AL 2,825,206
PNEUMATIC-HYDRAULIC POWER UNIT
Filed Dec. 12, 1956 5 Sheets-Sheet 4
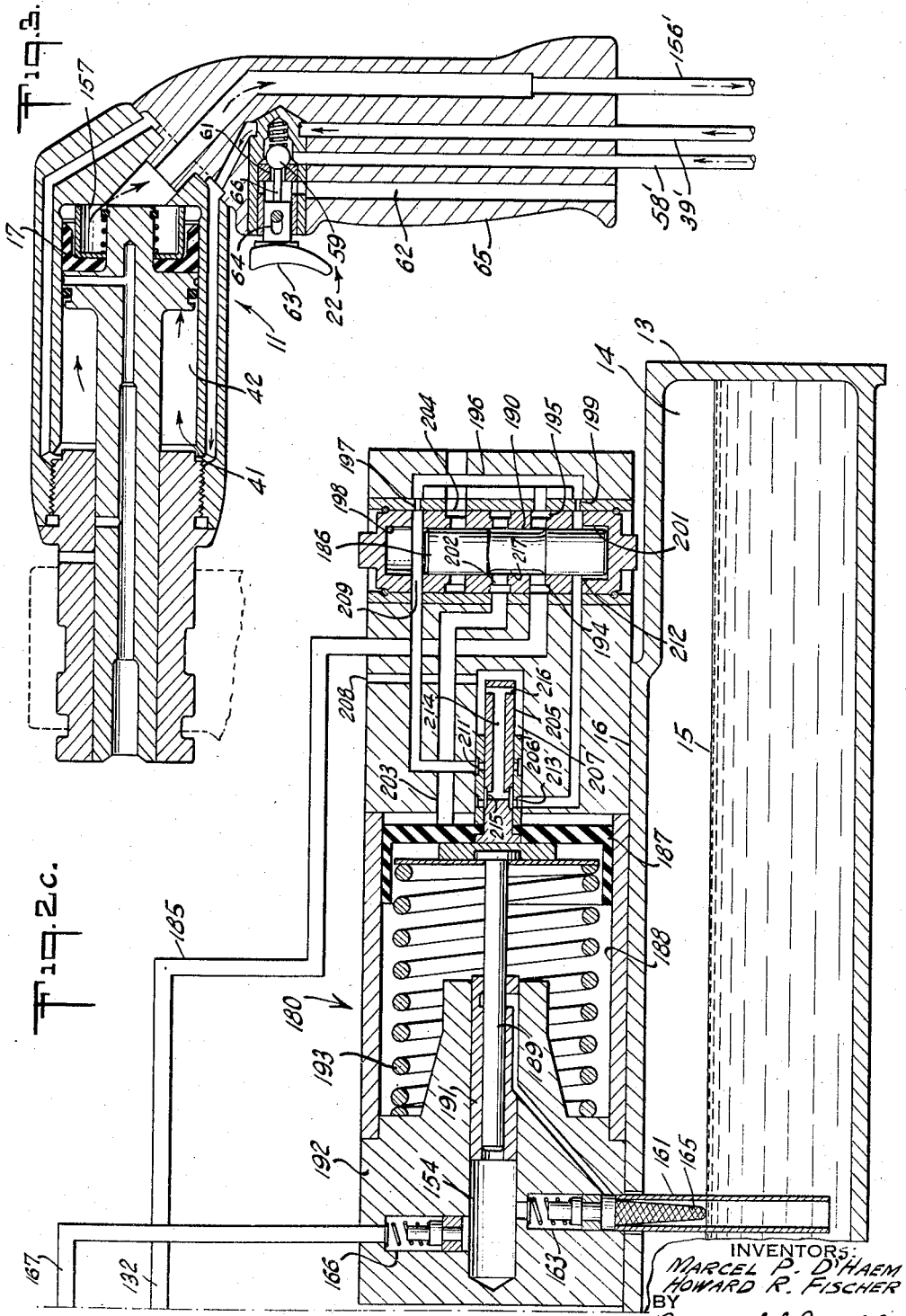
INVENTORS:
MARCEL P. D'HAEM
HOWARD R. FISCHER
BY
Raymond G. Mullee
ATTORNEY.

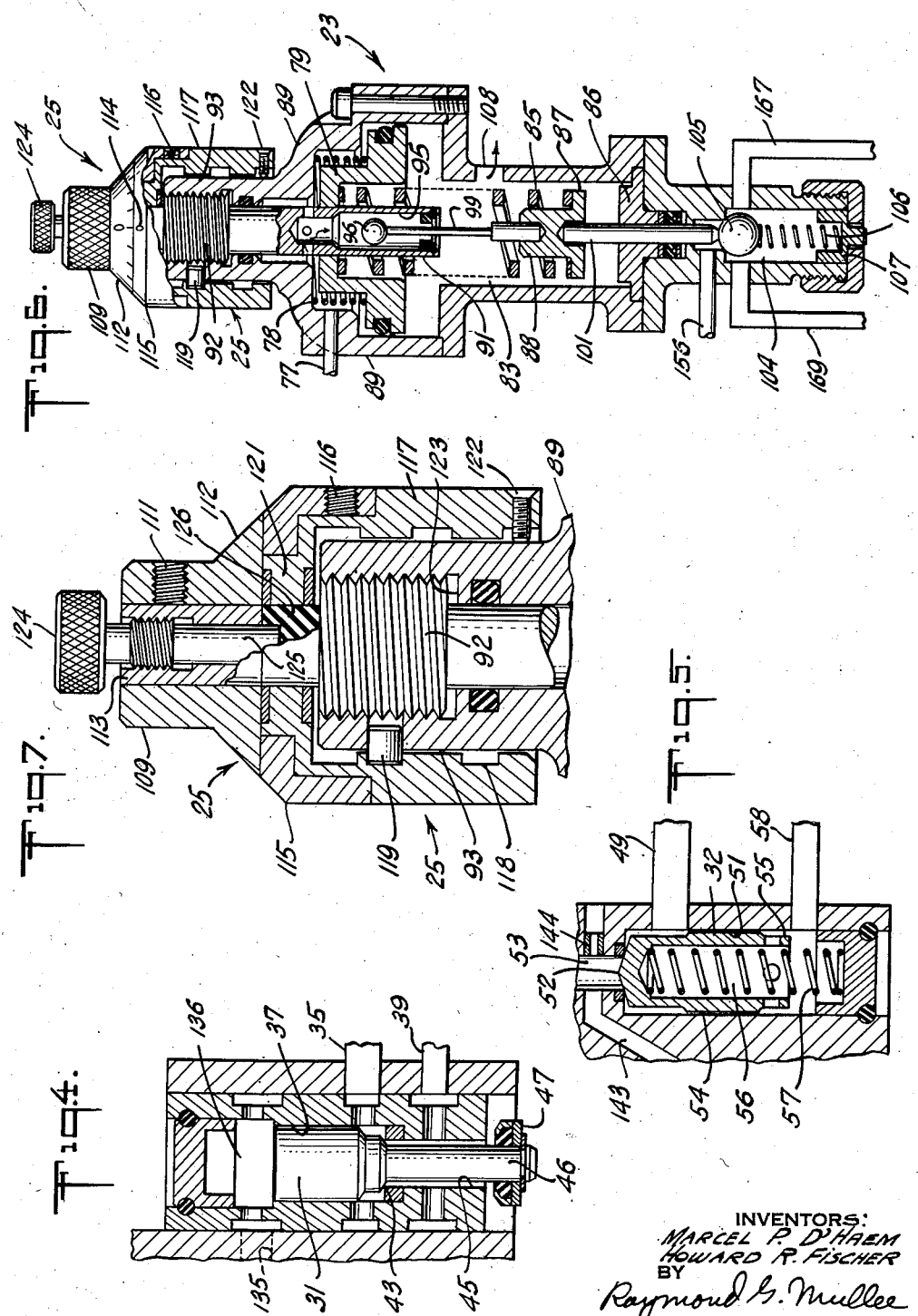

United States Patent Office 2,825,206
Patented Mar. 4, 1958

2,825,206

PNEUMATIC-HYDRAULIC POWER UNIT

Howard R. Fischer and Marcel P. D'Haem, Utica, N. Y., assignors to Chicago Pneumatic Tool Company, New York, N. Y., a corporation of New Jersey Application December 12, 1956, Serial No. 627,843

20 Claims. (Cl. 60—51)

This invention concerns a pneumatic-hydraulic power unit. In general, it comprises a high pressure hydraulic system and a controlled pneumatic system cooperable with one another to supply hydraulic power and pneumatic power in the operations of an associated device.

While the invention is subject to wide applicaton, it is of particular use in powering hydraulc tools; such as, riveters, rams, dimplers, punchers, crimpers, and other equipment requiring a controlled source of hydraulic fluid.

A feature of the invention lies in certain control means whereby the actual hydraulic delivery pressure to an associated tool may be closely regulated.

Another feature of the invention lies in an arrangement of a pneumatic hydraulic power unit and a work tool, wherein the operation of the power unit may be remotely controlled.

A still further feature is provided by a special cooperative association of elements whereby an arrangement incorporating the invention will, after it has been initially set in operation, continue to operate automatically to deliver a controlled hydraulic pressure until positively stopped by the intervention of the operator.

A further feature of the invention is certain overload safety mechanism which functions to prevent excessive build up of hydraulic pressure in the hydraulic delivery system.

Accordingly, a general object of this invention is to provide a novel and improved pneumatic-hydraulic power unit that is efficient in operation, practical in structure, and suitable for use with a wide range of hydraulic tools.

Another object of the invention is to provide a practical power unit having all of the foregoing features.

A further object of the invention is to provide a pneumatic-hydraulic power unit having a practical and efficient pressure control system whereby the hydraulic delivery pressure may be closely regulated.

A still further object is to provide a device of the foregoing nature which may be constantly used with the usual shop air power lines which have a constant pressure of about 90 pounds per square inch.

The invention further lies in the particular structure and novel arrangement of its various components as well as in their cooperative association with one another to effect the results intended herein.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a schematic showing of a pneumatic-hydraulic power unit and an associated work tool;

Figs. 2a, 2b and 2c are continuations of one another and illustrate schematically the different components of the invention;

Fig. 3 is an enlarged schematic showing of the work tool;

Fig. 4 is an enlarged view of the piston return needle valve, and shows the valve in seated condition;

Fig. 5 is an enlarged showing of the air inlet control check valve;

Fig. 6 is an operated view of the hydraulic pressure regulator; and

Fig. 7 is an enlarged detail of the mechanism for setting the hydraulic pressure regulator.

Figure 2A:
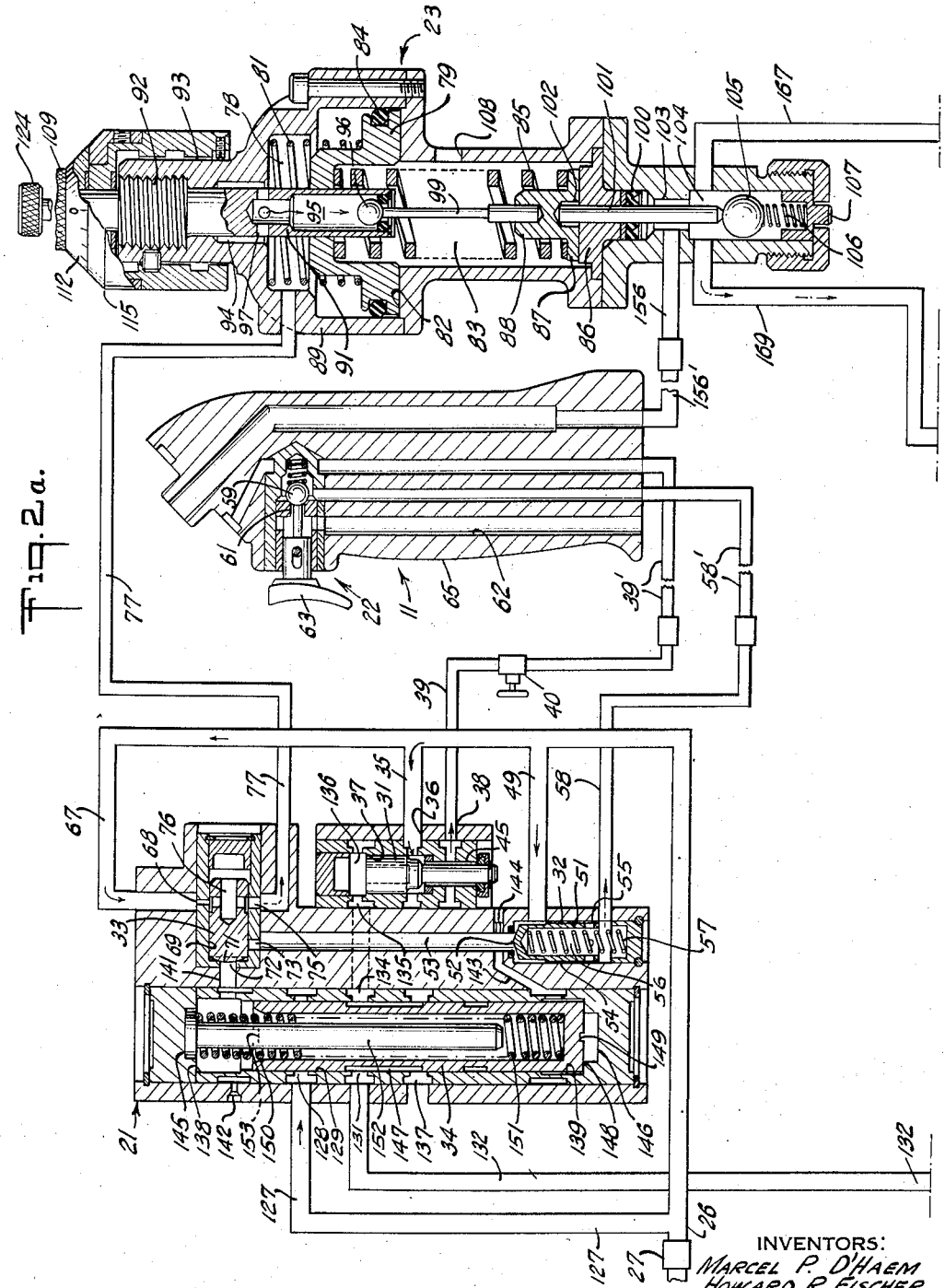

Reference is now directed to the drawings wherein (Fig. 1) there is shown a pneumatic-hydraulic power unit 10 associated with a pneumatic-hydraulic work tool 11, here illustrated as a riveter. The tool is remotely located from the power unit and is connected to the latter by suitable pressure fluid flexible supply lines, generally designated 12. The power unit includes a supporting wheeled base 13 the interior of which (Figs. 2b, 2c) provides a reservoir chamber or oil sump 14 formed to permit air pressurization of an oil supply 15 therein. The top wall 16 of the base provides a floor which supports a compact arrangement of elements that cooperate with one another to supply oil from the sump under pressure to drive a piston 17 of the work tool. They further cooperate to cause a supply of pressure air to return the piston and effect, as a consequence, a return flow of the oil to sump. A suitable cover 18, shown in broken line, is attachable to the base, and serves to house the elements supported above the base. The cover has a suitable handle 19 to enable manual portage of the power unit.

The arrangement of elements mentioned includes a pressure air distributor or control assembly 21, which is caused to be set in operation by a remotely located manually operated trigger control 22 carried by the handle of the work tool. Thereafter, its operation is automatically controlled by a master hydraulic pressure control regulator 23 until the manual control is released by intervention of the operator, whereupon operation of the air distributor ceases and further operation of the work tool immediately stops.

The hydraulic fluid 15 provided to drive the piston of the work tool is supplied under pressure through a pneumatically powered hydraulic system, generally indicated at 24 (Figs. 1, 2b,). The pressure air distributor functions to distribute pressure air to power the hydraulic system in order to effect a work stroke of the piston of the work tool. A return stroke of the piston is effected either as a result of an automatic operation of the hydraulic pressure control regulator 23 upon the development of an overload hydraulic pressure, or by intervention of the operator and release of the manual control 22. In either case, a shift operation in the air distributor assembly 21 will occur, which will cause a shift of pressure air from the hydraulic system to the return end of the piston of the work tool. Whereupon, the hydraulic system will cease functioning as a result of the shift of pressure air, and the shifted air acting on the work piston will cause a return of the latter as well as a return flow of hydraulic fluid from the opposite side of the piston to sump. The overload pressure at which the hydraulic pressure control regulator automatically operates is controlled by associated manually settable means 25 (Figs. 6, 7).

In view of the above, a more detailed explanation of the components of the invention and their cooperative association with one another to effect the operation of the work tool should now be easier to follow.

The pressure air distributor assembly (Figs. 1, 2a, 4, 5)

Pressure air is supplied to the distributor assembly 21 over a main supply line 26. The latter connects through a suitable air filter fitting 27, and outside flexible hose 28 extended to the supply line valve 29 of a suitable constant pressure source which may be the usual shop source of about 90 p. s. i. air pressure. The pressure air is fed by the air distributor to various elements of the power unit.

The air distributor assembly 21 comprises a plurality of cooperating air flow control valves, including a piston return needle valve 31, an air inlet control check valve 32, a servo valve 33, and a shift valve 34.

A first lateral 35 to the piston return needle valve 31 (Figs. 2a, 4) from the main air supply line 26 communicates through a radial port 36 with a cylindrical valve chamber 37. An output port 38 communicates chamber 37 with a piston return air feed line 39 connected to an outside flexible feed line 39′ which communicates (Fig. 3) through ports 41 of the work tool with the forward or return end 42 of the piston chamber of the latter. Slidable in valve chamber 37 is the needle valve 31. This has a reduced portion providing a rounded shoulder 43 which normally seats over a passage 45. The latter passage serves to communicate the input line 35 with the output line 39; and it opens out at its bottom end to atmosphere. The latter lines 35, 39 are closed off from one another when valve 31 is seated (Fig. 4). A stem 46 continuing from the seat end of valve 31 depends freely through passage 45 and carries fast on its external end a closure 47 for the vent or open end of passage 45. In the seated condition of the needle valve the closure 47 is clear of the bottom or vent end of passage 45, as in Fig. 4. A gate valve 40, the purpose of which will later appear, is normally open in the line 39.

Now, if we turn the main air supply valve 29 to "on" position, and leave it that way, pressure air flows through lateral line 35 to the chamber 37 of the needle valve to unseat the latter, as appears in Fig. 2a. This action lifts the closure 47 to seal over the vent end of passage 45, and communicates line 35 through passage 45 with line 39. Whereupon, pressure air flows over the latter line to pressurize the return end 41 of the piston chamber of the work tool.

The inlet control check valve (Figs. 2a, 5)

A second lateral air supply line 49 to the air distributor assembly 21 leads to the cylindrical chamber 51 in the area of an annular space provided about a reduced nose end 52 of the inlet control check valve 32. Valve 32 is cup-form and is slidable in chamber 51. It is spring loaded to seat its nose end 52 over an outlet passage 53, the function of which will later appear in its proper order. Pressure air entering chamber 51 flows about flats 54 of the valve body to a reduced open end 55 of the valve. It flows over this open end as well as through nearby radial ports, into a pocket 56 of the valve. The pressure air in the pocket aids a spring 57 therein in holding the nose end of the valve seated over passage 53. The pressure air also flows from about the open end of this valve through a radial port of the chamber into a connected control line 58 which leads through a connected outside flexible line 58′ to the chamber of a check valve 59 associated with the manual trigger control 22 of the work tool (Figs. 2a, 3). Valve 59 is spring loaded to seat over a port 61 which vents by a passage 62 to atmosphere. A trigger 63 has a shank portion mounted by pin and slot elements 64 for sliding movement in a recess of the handle 65 of the work tool. A pin 66 extending from the trigger's shank projects freely into the larger diameter port 61 and abuts inoperatively against the spring loaded check valve 59. Pressing the trigger will unseat the valve and vent line 58 to atmosphere.

Servo valve (Fig. 2a)

A third lateral 67 off the main air supply line to the air distributor 21 leads through a reduced radial port 68 to the mid-area of a cylindrical chamber 69 in which the servo valve 33 slides. Valve 33 has a position in Fig. 2a at one end of its chamber where a beveled nose end 71 seals over an exit port 72, and where a nearby peripheral surface of the valve seals over an inlet port 73 connected with the passage 53. When valve 33 is in its opposite position, ports 73 and 72 are in communication with each other through the valve chamber. The functions of ports 73 and 72 will appear later in their proper order. The inlet port 68 constantly registers through a peripheral groove about the valve body with an outlet port 75, whether the valve be at one end of its chamber or the other. The peripheral groove communicates radially with a pocket 76 in the valve, whereby air pressure caused to build up in the pocket holds the valve in its leftward position.

The outlet port 75 from the servo valve chamber is of larger diameter than the inlet port 68 and leads by a control line 77 to the upper chamber 78 of the master hydraulic pressure control regulator 23.

Master pressure control regulator (Figs. 2a, 6, 7)

The master pressure control regulator 23 has a normal position as in Fig. 2a wherein a crowned piston member 79 slidable in the upper chamber 78 is loaded by a return coil spring 81 so as to seat upon an annular shoulder 82, formed due to a reduced lower or venting chamber 83. An O-seal ring 84 is provided in the periphery of the brim portion of piston 79. Pressure fluid entering the upper chamber 78 over control line 77 from the servo valve 33 further loads the piston 79 upon its shoulder. Disposed in the lower chamber is a heavy coil spring 85, the upper end of which abuts the ceiling wall in the recess of the crown of the piston member 79. The bottom end of the lower chamber 83 is sealed by a fixed plug or bushing 86. Resting upon the flat top surface of this plug is a flanged base 87 of a ball pusher. The bottom end of the heavy spring 85 rests on this base, while a reduced cylindrical boss or body 88 extends from the base up into the central area of the spring.

The housing of the pressure regulator provides a bonnet 89. A cylindrical vertically disposed stem 91 is threadedly engaged at its upper portion 92 in a complementary neck piece 93 of the bonnet. The lower section of the stem 91 slide fits through a short section of the neck piece 93 and then extends first freely through narrow recess 94 of the upper chamber, then through the upper chamber 78, and next, it slide fits through the crown of the piston into the recess and lower chamber 83 below.

Opening out of the bottom end of stem 91 is a counterbore 95 which accommodates a steel ball check valve 96. Pressure air entering the upper chamber 78 of the pressure regulator flows into the recess 94 and passes through radial ports 97 into the counterbore of the stem wherein it is blocked from escaping into the venting chamber 83 by the seated check valve. A pilot rod 99 carried by the boss 88 of the ball pusher projects axially upward in line with the ball valve 96. A drive rod 101 projects with a slide fit through the plug 86 and packing 100 therein. The upper end of the drive rod extends into a recess 102 formed in the underside of the ball pusher. The lower end of the drive rod projects freely through a hole 103 of larger diameter into a hydraulic pressure control chamber 104 below, wherein it rests upon a stainless steel ball 105 that is seated upon a coil spring 106. The latter is retained at its lower portion in the recess of a plug 107 which seals the bottom end of the pressure chamber. Ball 105 has a diameter slightly less than that of its chamber. Hydraulic pressure is caused to build up in the chamber 104 in a manner that will be later described. It is plain, that when an overload pressure builds up in chamber 104, ball 105 will rise and lift the drive rod 101. The latter will project the pilot rod 99 against the load of spring 85 through the larger diameter seat opening of the check valve 96 and will unseat the latter. Consequent to this action, pressure air in the upper chamber 98 of the pressure control regulator will flow through valve 96 into the lower venting chamber and will exhaust through a side vent 108.

The overload hydraulic pressure required to be built up in the pressure control chamber 104 to effect a release of valve 96 can be closely regulated. Threading stem 91 further out of the bonnet 89 of the regulator will lift the ball valve 96 further above the pilot element 99 and, accordingly, a greater hydraulic pressure will be required to raise the pilot element against the load of the heavy coil spring 85 to unseat the valve.

The up or down position of the stem 91 carrying the valve 96 can be closely regulated and set by a control knob 109 (Fig. 7) fixed by a seat screw 111 to an upper end 113 projecting above the threaded portion 92 of stem 91. This knob carries a micrometer scale 112. The latter is readable against a 0-mark 114 carried on an indicator ring 115 fixed, as by a set screw 116, to a reduced surface of a collar member 117. The latter sleeves the neck 93 of the bonnet housing 89. The internal wall of the collar has a spiral channel 118 which is adapted to ride over a projecting pin 119 fitted in the neck 93 of the bonnet. The collar has at its upper end a radially inturned flange 121 having an axial aperture through which the upper end 113 of stem 91 slide fits. The collar is limited in the extent of its downward adjustment on the neck piece 93 upon abutment of its flange 121 with the top end of the bonnet neck 93. Its upward adjustment is limited when a stop screw 122 in the terminus of channel 118 is carried into abutment with the pin 119. After the collar has been adjusted as desired, tightening the stop screw 122 will fix its position. The distance the stem 93 can be moved out of the bonnet will be determined by the adjusted position of the collar 117. Upon engagement of the upper shoulder of the threads 92 with the overhanging radial flange 121, upward movement of the stem member 91 will be limited; upon engagement of the shoulder of the lower end of the threads 92 with the internal neck shoulder 123, downward movement will be limited.

The control knob 109 may be adjusted so that its zero point will align with the zero mark 114 of the indicator ring when the stem 91 has been threaded to its downward limit. The adjusted position of the knob may be set by the set screw 111. The stem 91 may be threaded in an outward or return direction by manually turning the knob 109. The consequent spacing of the ball valve 96 above the pilot rod 99 may be read off the micrometer scale 112. At zero adjustment, the check ball 96 will be seated and its underside will be immediately above the pilot member, as in Fig. 2a. A selected adjusted position of the stem member 91 may be fixed by locking the knob 109 in its adjusted position to the neck 93 of the bonnet. This is enabled by a thumb screw 124 which is threaded in the top end of stem 91. This screw has a depending extension 125 which is adapted to cam a friction element 126, radially disposed in a slot of the stem, into locked engagement with the inner wall of the flanged end 121 of the neck 93 of the bonnet.

*Main shift valve (Fig. 2a)*

A fourth lateral 127 from the main air supply line to the air distributor assembly 21 connects by a radial port 128 with an elongated cylindrical valve chamber 129. A radial outlet port 131 connects this chamber with a main output line 132 that serves to feed pressure air to operate the hydraulic system 24. Directly opposite the output port 131, and also communicating with the latter by an internal annular groove in chamber 129, is a second output port 134 which connects by a passage to a radial port 135 communicating with a pocket 136 formed above the needle valve element 31. Below output port 131 is an exhaust port 137 to atmosphere. Opposite end portions 138, 139 of chamber 129 are slightly enlarged radially. The enlargement 138 at the upper end communicates by a radial port and passage 141 to the end port 72 of the servo valve chamber 69. It also vents by bleeder hole 142 to atmosphere. The enlargement 139 at the lower end of the chamber communicates by a passage 143 with passage 53. The latter is vented by a bleeder hole 144. Shallow wells 145, 146 are provided in opposite ends of chamber 129.

Slidable in the chamber 129 is the shift valve 34 which has an annular groove 147 about its mid-area. It also has a hollow interior providing a pocket which is sealed at the bottom end by a wall 148, and which opens through the opposite end. This end wall has a cross slot 149. A coil spring 151 loaded in the pocket of the valve seats the end wall 148 upon a shoulder formed about the end well 146. A spring guide rod 152 is disposed centrally of the spring. The guide rod is provided with a head at one end which rests upon the end of the spring and is disposed in the shallow upper end well 145. In this position of valve 34 its surface seals over the pressure air inlet port 128, while the grooved section 147 communicates the exhaust port 137 with the hydraulic system main air feed line 132 and also with the passage 135 leading to the pocket end of the needle valve chamber 37. Further, in this normal position of the shift valve 34, the well 146 underlying the end wall 148 is in communication with passage 143 through the cross slot 149 and space 139. When valve 34 is shifted to its upper position, the groove section 147 of the valve communicates the input line 127 with the output lines 132, 135. Despite the upward moved position of the valve, the pocket 150 thereof will continue to be in communication with the passage 141 connected to the servo valve, due to a slight clearance that will remain at the upper end of the valve. A slight notch 153 may if desired, be provided transversely of the rim of the valve.

*Initiating pumping operation*

After the main supply valve 29 has been turned "on," as described above, operation of the entire system is initiated by depressing the trigger 63 at the handle of the work tool, and holding it depressed. This unseats the trigger check valve 59 and vents the control air lines 58, 58' to atmosphere, thereby relaxing back pressure on the air inlet control check valve 32. Whereupon, intake air from lateral line 49 unseats the latter, flows into passage 53 and through passage 143 and end slot 149 to the well 146. Here, it builds up and forces the shift valve 34 to its upper position. Pressure air thereupon flows from the lateral intake line 127 and about the groove 147 of the shift valve to the pocket 136 above the needle valve 31. This reseats the latter and cuts off flow over lines 39, 39' to the return end of the piston chamber of the work tool. Pressure air in the latter chamber relieves over line 39 and vent passage 45 to atmosphere. Pressure air also flows from the intake line 127 about the groove of the shift valve 34 to the main output or feed line 132. This latter feeds the hydraulic system 24 with pressure air so as to effect pressurization of the oil in the sump 14, consequent oil flow to a pair of compression chambers 154, 155, and subsequent pumping of the oil from the latter through various passages to an output line 156 and a connected outside flexible line 156' which feeds the oil to the rear or drive end 157 of the piston chamber of the tool.

*Hydraulic pressurization and pump system (Figs. 2a, 2b, 2c)*

A lateral line 158 from the main feed line 132 to the hydraulic system feeds pressure air through a sump check valve 159 into the sump chamber. Resulting pressurization of the latter causes oil to rise through a pair of pipes 161, 162 which respectively lead through check valves 163, 164 to the separate compression chambers 154, 155. Suitable oil filters 165 are fitted in pipes 161, 162. Compression chamber 154 connects through a check valve 166 with a line 167 which leads radially to the hydraulic pressure control chamber 104. Compression chamber 155 connects by a similar check valve 168 with a line 169 which also leads radially into the pressure control chamber. While it is possible for both lines 167, 169 to merge and empty by a common line into the pressure control chamber 104, here however, two separate lines are provided. The control chamber has a reduced upper section 103 which freely surrounds a section of the pilot drive rod 101 and connects radially with the hydraulic output line 156 leading to the drive end 157 of the piston chamber of the work tool.

Return oil flow from the work tool and hydraulic output line 156 to sump is enabled by a relatively reduced lateral passage 171 extending from the chamber of the upper check valve 168. This return passage 171 leads through a port 183 to a chamber 172 of a return flow control or pressure release valve 173. Chamber 172 connects by a reduced return line 174 with a port 175 leading into the sump pipe 162 at a point below the lower check valve 164.

Return control valve

The return control valve 173 has an elongated stem 176 which slide fits through the body of the valve block 177 and projects at its upper end through a suitable seal pack 178 into an enlarged air pressurization chamber 179. A large piston 181 carried on the upper end of the valve stem works in this chamber. A return spring 182 acting on the underside of the piston normally holds the latter in its uppermost or raised position so that the valve is normally raised from port 183, whereby the return lines 171, 174 are normally open to sump.

A second lateral 184 from the pressure air feed line to the hydraulic system connects with the head end of the piston chamber 179 of the return flow control valve 173. Pressure air fed to this head end seats the return valve over port 183 and shuts off return flow to sump.

Pump and pump control valve (Figs. 2b, 2c)

A third lateral line 185 from line 132 feeds pressure air to operate an hydraulic pump 180 (Fig. 2c). A pump control valve 186 is provided to effect automatic reciprocating pumping action of the pump. The pump includes a piston 187 which reciprocates in a chamber 188. Axially extending from the work end of the piston is a ram rod 189 which is slidable through a bushing 191 of a supporting block 192 into the compression chamber 154. Movement of the ram rod into chamber 154 rams oil from the latter through the upper check valve 166 into the line 167 leading to the pressure control chamber 104. A coil spring 193 serves to return the piston. The lateral air feed line 185 connects through a radial port 194 and an internal annular recess with the chamber 190 of the pump control valve. Opposite port 194 is an outlet port 195 which connects by a common passage 196 with a relatively reduced orifice 197 leading to a slightly radially enlarged end 198 of the valve chamber. Common passage 196 also connects at its opposite end by a second reduced orifice 199 with a similarly radially enlarged opposite end 201 of the valve chamber. A little above inlet port 194 an outlet port 202 connects by a piston feed passage 203 with the head end of pump chamber 188. An exhaust for the piston feed passage 203 is provided by a port 204 venting the pump control valve chamber. Control valve 186 slides in chamber 190.

Piston pump slide valve (Fig. 2c)

Axially extending from the head end of the pump's piston 187 and unitary therewith is a slide valve 205. The latter reciprocates through a bushing 206 which extends partway into a chamber 207. The chamber space rearwardly of the bushing is vented by a passage 208. The enlarged end space 198 of the pump control valve chamber connects by a radial port 209 and a passage with a radial port 211 through the right end of the slide valve bushing 206, while the opposite end space enlargement 201 connects by a radial port 212 and a passage with a radial port 213 through the left end of the slide valve bushing. The slide valve has an internal axial bore 214 which opens at one end by radial ports and a peripheral groove 215, and at the other end by radial ports 216. In the returned position of the piston (Fig. 2c) the peripheral groove 215 of the slide valve registers with the radial port 213, and the radial ports 216 at the end of the slide valve register with the vent 208; while the body surface of the valve closes over the radial port 211. In this position of the slide valve the space 201 at one end of the pump control valve chamber is vented, and the opposite end 198 is closed from vent. In the driven position of the pump's piston 187, the body of the slide valve 205 closes over port 213 and the end of the slide valve is drawn clear of radial port 211, so that the vented condition of end enlargements 201, 198 of the pump control valve chamber is reversed.

Pump operation

Now, in the operation of pump 180, pressure air fed to the pump control valve chamber 190 flows about the groove 217 to the piston feed line 203 and also through the common passage 196 to the ends 198, 201 of the chamber. Air fed to the end 201 vents through the slide valve 205, while air pressure builds up in the pocket 198 at the opposite end, thus holding the control valve 186 in its present position. The air fed to piston 187 causes the latter to move and ram oil from the compression chamber 154 past the check valve 166 and through the pressure control chamber 104 to the output line 156 leading to the rear end of the piston chamber of the tool, causing a work stroke of the latter. As the piston 187 moves, it carries the slide valve 205 with it. At the end of the piston stroke the slide valve closes from vent the end 201 of the control valve chamber, and opens the opposite end 198 to vent. Accordingly, air pressure builds up at the end 201 of the control valve, and reverses the position of the latter. This cuts off the input and output piston air feed lines 185, 203 from each other, and the groove 217 connects the piston feed line 203 with vent 204; whereupon spring 193 acts to restore the piston. As the piston restores, the condition of the control valve 186 is automatically reversed by action of the returned slide valve 205; and the pump cycle repeats itself.

A fourth lateral line 200 leads off the air feed line 132 and connects to a second hydraulic pump 218. This pump is identical in structure and arrangement to the other, so that both pumps operate simultaneously to pump oil through the control chamber 204 to the output line 156.

It is obvious that one of the pump control valves 186, 186' could be positioned in its chamber so that it would have at the start of operations a position reversed to that of the other. By this arrangement, it is plain that by the time pressure air operates on the reversed valve and reverses its position so that pressure air may be fed to the associated pump's piston, the other piston will have already begun to move. In this manner, the pumping action of the second pump will lag a little behind that of the first, and a steady stream of pressurized oil will be pumped into the pressure control chamber 104.

Discontinuance of pump operations

The pumping operations of the hydraulic system will continue automatically until the operating air supply from the air distributor assembly is cut off. This may be done by releasing the trigger control 63; or it will occur when an overload pressure develops in the hydraulic output lines and causes the master pressure regulator 23 to effect an automatic cut-off of pressure air flow from the distributor assembly to the hydraulic system.

An overload in the hydraulic system occurs whenever the hydraulic pressure therein rises to a value required to lift the pilot rod 99 sufficiently to unseat the release check valve 96. When the latter action occurs, pressure air in the upper chamber 78 of the regulator escapes about ball valve 96 to vent. This relaxes the back pressure on the servo valve 33 of the air distributor. Air feeding into the pocket 76 of the servo valve from the lateral line 67 then tends to force this relaxed valve from its seat 72, and pressure air in passage 53 acting on the beveled nose end 71 of the valve shifts the valve and flows through ports 73, 72 and passage 141 to the upper end and pocket of the shift valve chamber 129. Some of this air vents through port 142. Passage 53 is of relatively greater diameter than passage 143 so that the opening of passage 53 to the upper end of the shift valve chamber vents the underside 146 of the shift valve 129, whereupon spring 151 shifts or returns the latter to its lower position. This action seals the pressure air intake line 127 off from the output line 132, and communicates the latter and its connected lateral feed lines through the groove of the shift valve to vent 137; whereupon operating pressure air flow to the hydraulic system is cut off and the latter ceases to operate.

As the pressure air in the lateral feed line 158 to the sump check valve 159 is vented, the greater pressure of air in the sump 14 unseats a slide body 219 which contains the check valve 159, and escapes through the side vents 221 in the housing of the slide body. As the pressure air vents from the chamber 179 of the return flow control valve 173, the latter under the action of the return spring 182 opens the oil return lines 171, 174 to sump. When the air distributor valve 129 shifts, as above, air feed to the pocket 136 of the needle valve 31 ceases and the pocket thereof is connected to the vent 137. This action causes the needle valve 31 to unseat under pressure of air flow over the lateral line 35, whereupon pressure air feeds over the return line 39 to effect pressurized return of the tool piston 17 and consequently, a quick return of hydraulic fluid through the output lines to sump.

Though the pressure air in regulator valve 23 has been released to vent due to the overload action, air continues to flow from line 67 through the servo valve and over line 77 to the upper chamber 78; so that, as soon as the overload in the hydraulic lines is sufficiently relaxed the pilot rod 99 will restore and the upper chamber 78 of the regulator valve will again become pressurized. Consequent upon this latter action, the servo valve closes over ports 73, 72, the pressure air in the upper end 138 of the shift valve chamber relieves through the vent 142, and flow in passage 53 is diverted to the underside 146 of the shift valve 129. The latter thereupon again shifts, the needle valve 31 again unseats, and the hydraulic system is again pressurized to operate the tool, as long as the trigger 63 is held depressed.

Pumping action may be stopped at any stage of the cycle of the piston of the tool by releasing the trigger valve 59 to closed position. This action will, as is evident from the earlier description of the inlet control check valve 32, reseat the latter over passage 53 and thereby cut off pressure air to the underside 146 of the shift valve, whereupon air pressure on the underside of the latter will vent from passages 143, 53 through port 144. The coil spring 151 will thereupon act to shift the valve 129 to its lower position and the actions of the hydraulic system and cycling of the piston of the tool will cease; and so on, as explained above.

The power unit described above may also be used with hydraulically driven piston tools of the spring return type. In tools of this type the normally open gate valve 40 in the return feed line 39 will be returned to "closed" position so as to prevent an unnecessary flow of return air from the needle valve 31 to the return end of the piston chamber.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is our intent, therefore, to claim the invention not only as shown and described herein but also in all such forms and modifications as may be reasonably construed to fall within the spirit of the invention and the scope of the appended claims.

What is claimed is:

1. A pneumatic hydraulic power unit for powering a work piston by hydraulic fluid to effect a work stroke, and for returning the piston by pressure air, comprising: a hydraulic pump operable by pressure air to force hydraulic fluid against the head end of the piston; pressure air distribution means having two operating conditions, being effective in one condition to supply pressure air to operate the hydraulic pump and being effective in the other condition to cut off the pressure air supply to the pump and to supply it to the forward end of the piston to effect a return stroke of the latter; and control means provided for effecting a shift in the operating conditions of the distribution means from one condition to the other.

2. In apparatus as in claim 1, wherein the distribution means is characterized by a shift valve slidable in a chamber and having one position in the chamber where it cuts off flow of operating pressure air to the hydraulic pump and supplies it to the forward end of the piston and having a reverse second position in the chamber where it cuts off flow of operating pressure air to the forward end of the piston and supplies it to the hydraulic pump.

3. In apparatus as in claim 2, wherein the shift valve is spring loaded in its first position and is seated over a pressure well adapted to receive a supply of pressure air to shift the valve against the spring load to the second position.

4. In apparatus as in claim 2, wherein the shift valve is spring loaded in its first position and is seated over a pressure air build-up well adapted to receive a supply of pressure air to shift the valve against the spring load to the second position, and the control means serves to control flow of pressure air to the pressure well.

5. In apparatus as in claim 1, wherein the control means is operatively associated with manually operable main control means.

6. In apparatus as in claim 1, wherein means is provided for effecting operation of the control means at will and other means is provided for effecting automatic operation thereof in response to an overload pressure in the hydraulic fluid output from the pump.

7. A pneumatic-hydraulic power unit for supplying operating hydraulic fluid to one end of a work piston at one time and for supplying operating pressure air to the opposite end of the piston at another time, comprising: a hydraulic system operable by pressure air to force hydraulic fluid against the one end of the piston; pressure air distribution means having two operating conditions, being effective in one condition to supply pressure air to operate the hydraulic system and being effective in the other for cutting the pressure air supply off from the hydraulic system and feeding it to the opposite end of the work piston, control means for effecting a shift in the operating conditions of the distribution means from one condition to the other, means associated with the control means and being responsive to an overload pressure in the operating hydraulic fluid to actuate the control means to effect a shift operation of the distribution means so as to cut off the supply of operating pressure air to the hydraulic system, and means operable in response to a cut-off of pressure air supply to the hydraulic system to effect a return flow of hydraulic fluid from the work piston to the hydraulic system.

8. A pneumatic-hydraulic power unit to supply operating hydraulic fluid to one end of a work piston at one time, and for cutting off the supply of hydraulic fluid to the piston and supplying operating pressure air to the opposite end of the piston at another time, comprising a sump, a hydraulic system operable by pressure air to force hydraulic fluid from the sump to one end of the piston, pressure air distribution means having two operating conditions and being effective in one condition to supply pressure air to operate the hydraulic system and being effective in the other for cutting off the pressure air supply to the hydraulic system and feeding it to the opposite end of the work piston, control means for effecting a shift in the operating conditions of the distribution means from one condition to the other, overload check valve means associated with the control means and being responsive to an overload pressure in the hydraulic system to actuate the control means to effect a shift in the operating condition of the pressure air distribution means so as to cut off the supply of pressure air to the hydraulic system, and means operable in response to a cut-off of pressure air supply to the hydraulic system to effect a return flow of hydraulic fluid from the work piston to sump.

9. In the apparatus as in claim 8, wherein the hydraulic system includes check valve means for admitting pressure air to pressurize hydraulic fluid in the sump, a plurality of compression chambers for receiving pressurized fluid from the sump through associated pipe line means, a common feed line from the chambers to the one end of the work piston, and a pressure air operated pump associated with each compression chamber for driving the fluid therefrom into the common feed line.

10. In the apparatus as in claim 9, wherein air control means are provided in the hydraulic system to control the flow of pressure air to the pumps and are arranged for operation of the pumps in lagging relation to one another.

11. In a combination, including a pneumatic hydraulic system having an hydraulic output line, an hydraulic overload pressure responsive device, and a pressure air distribution device arranged to distribute pressure air to the overload pressure responsive device and operating pressure air to the hydraulic system and adapted to shut off the flow of operating pressure air to the hydraulic system when the flow to the pressure responsive device is vented, an hydraulic overload pressure responsive device comprising an hydraulic pressure control chamber connected in the hydraulic output line, a pressure air receiving chamber connected to the air pressure distribution device, a pressure air venting chamber, a check valve sealing off communication of the pressure air receiving chamber from the venting chamber, and means actuable by an overload pressure of hydraulic fluid in the pressure control chamber to unseat the check valve so as to communicate the pressure air receiving chamber with the pressure air venting chamber.

12. In a combination as in claim 11, wherein the venting chamber is disposed in axial alignment with and between the hydraulic pressure control and pressure air receiving chambers, a bushing seals off the venting chamber from the control chamber, a piston for unseating the check valve is slidable in the bushing and projects in part to a particular position in the control chamber and in part through the venting chamber in close proximity to the check valve, and the piston is adapted to be actuated by an overload pressure of hydraulic fluid in the control chamber to unseat the check valve.

13. In a combination as in claim 12, wherein a yieldable load restrains actuation of the piston by the hydraulic fluid in the control chamber until the pressure of the hydraulic fluid is of a value sufficient to overcome the restraining load.

14. In a combination as in claim 12, wherein the check valve is adjustable to a plurality of selective positions away from the piston, so that the distance the piston must be moved to unseat the check valve is dependent on the adjusted position of the check valve.

15. In a combination as in claim 14, wherein the check valve comprises a ball member having a seat in a movable housing and external manual means is provided for moving the housing and as a consequence the ball relatively to the piston.

16. In a combination as in claim 15, wherein indicator means is carried externally by the movable housing for indicating the adjusted position of the ball member relative to the piston.

17. An hydraulic pressure responsive device comprising a housing having an hydraulic pressure control chamber adapted to be connected in the output line of a hydraulic pumping system, a pressure air venting chamber sealed off from the latter chamber, and a control pressure air receiving chamber in communication with the venting chamber, the receiving chamber being adapted for connection to a control pressure air line of control mechanism that is operable to terminate operations of the hydraulic pumping system upon venting of the control pressure air line, valve means normally sealing the air receiving chamber off from the venting chamber, and means associated with the valve means and actuable by pressure of hydraulic fluid from the output line developing above a predetermined value in the hydraulic pressure control chamber to unseal the valve means so as to communicate the air receiving chamber and as a consequence the control pressure air line with the venting chamber.

18. A device as defined in claim 17, wherein the three chambers are disposed one above the other in axial alignment, the venting chamber being located between the other two and below the receiving chamber, an elongated piston is slidably supported in the housing between the venting chamber and the hydraulic pressure control chamber and extends axially from the latter chamber into the venting chamber, the valve means comprises an elongated stem, the lower portion of which stem fits seal tight through an opening between the receiving chamber and the venting chamber and has a recess opening radially out of its upper end into the receiving chamber and opening axially out of its lower end into the venting chamber, a ball valve freely movable in the recess and seated therein over the lower end opening, the stem member having a position wherein the ball valve is above and in close proximity to the free end of the piston, and the latter is adapted upon an overload pressure developing in the hydraulic pressure control chamber to displace the ball valve from its seat so as to communicate the receiving chamber with the venting chamber.

19. A device as defined in claim 18, wherein the upper end of the stem is threadedly engaged in a neck portion of the housing and an externally projecting end of the stem is manually turnable whereby the stem may be threaded in or out of the neck of the housing so as to adjust the proximity of the ball valve relative to the piston.

20. A device as in claim 19, wherein the external end of the stem carries a turn-knob having indicia thereon readable against marking on the exterior of the housing whereby the adjusted position of the ball valve relative to the piston may be determined.

References Cited in the file of this patent

UNITED STATES PATENTS

| | | |
|---|---|---|
| 2,455,747 | Fischer et al. | Dec. 7, 1948 |
| 2,573,993 | Sedgwick | Nov. 6, 1951 |